United States Patent [19]

Murayama et al.

[11] 3,772,518

[45] Nov. 13, 1973

[54] PYROELECTRIC COORDINATE INPUT PROCESS AND APPARATUS

[75] Inventors: Naohiro Murayama; Hideyuki Hashizume, both of Iwaki, Japan

[73] Assignee: Kureha Kagaku Kogyo Kabushiki Kaisha, Tokyo, Japan

[22] Filed: Apr. 7, 1972

[21] Appl. No.: 241,941

[30] Foreign Application Priority Data

Apr. 7, 1971 Japan .......................... 46/21006

[52] U.S. Cl. ........ 250/211 R, 250/220 M, 250/330, 250/332

[51] Int. Cl. .......................................... G01j 5/02

[58] Field of Search .................. 250/83 R, 83.3 H, 250/83.3 HP, 211 R, 220 M, 330, 332

[56] References Cited

UNITED STATES PATENTS

| | | | |
|---|---|---|---|
| 3,600,060 | 8/1971 | Churchill et al. | 250/83 R X |
| 3,415,992 | 12/1968 | Webb | 250/83 R X |
| 3,581,092 | 5/1971 | Pearsall et al. | 250/83 R X |
| 3,539,803 | 11/1970 | Beerman | 250/83.3 H X |
| 3,676,676 | 7/1972 | Somer | 250/83 R |

*Primary Examiner*—Archie R. Borchelt
*Attorney*—Richard C. Sughrue et al.

[57] ABSTRACT

Process and apparatus for coordinate input of the irradiation position of an irradiating light by taking out a signal corresponding to the light irradiated onto the surface of a polymeric film, such as that of polyvinylidene fluoride, having pyroelectric properties in the form of a pyroelectric current from each of a plurality of electrodes provided on the surface of said film.

14 Claims, 7 Drawing Figures

PYROELECTRIC COORDINATE INPUT PROCESS AND APPARATUS

BACKGROUND OF THE INVENTION

1. Field of the Invention

This invention relates to a coordinate input process and an apparatus therefor, utilizing pyroelectricity.

2. Description of the Prior Art

Pyroelectricity in the phenomenon wherein the polarization of a dielectric body changes with temperature. In this case, the polarization includes not only the dipole (positive and negative charges that constitute a pair in terms of a molecular measure) in the substance, but also a dipole produced by an actual electric charge.

It is known to produce a pyroelectric current by transmitting heat directly to a substance having pyroelectricity or subjecting the substance to radiations, such as light, which can be converted to heat. However, the crystals of glycinium sulfate, lead titanate, etc., have previously been used as pyroelectric substances, and it has been difficult to produce a wide film having uniform pyroelectric properties. Furthermore, since a pyroelectric substance of small size is used, only one electric current can be taken out from one pyroelectric substance. When this current is applied to an input apparatus for electronic computers, transmission devices, or displays, only a one-dimensional signal can be obtained. Although a coordinate input apparatus having a two-dimensional extent, such as figures, can be formed by assembling signal input devices in each of which only one pyroelectric element is used, it is very complicated to wire each pyroelectric substance for grounding and input currents, and much labor is required to produce such a coordinate input apparatus.

SUMMARY OF THE INVENTION

According to this invention, there is provided a process and an apparatus for coordinate input of the irradiating position of an irradiating light by taking out a signal corresponding to the light irradiated onto the surface of a polymeric film having pyroelectricity, the signal being in the form of a pyroelectric current from each of a plurality of electrodes present on the surface of said film.

According to this invention, the pyroelectric substance is basically a single sheet of film, and therefore, grounding can be performed in an ordinary manner. Furthermore, when wiring for an input current is provided for each electrode, the wiring operation can be simplified, for example, by assembling mutually insulated electric wires and bonding them to the film simultaneously. Since it is easy to render the pyroelectricity of the localities of one pyroelectric film uniform, if the size of each locality is made the same, it is possible to take out an electric current according to the intensity of radiation applied to each locality. Thus, the amount of the dose of radiation can be recorded at the same time, and the process can be used also for receiving and transmission of images. The present invention includes many specific embodiments, but several typical examples will be described with reference to the accompanying drawing.

DESCRIPTION OF THE PREFERRED EMBODIMENT

Figure 1A:
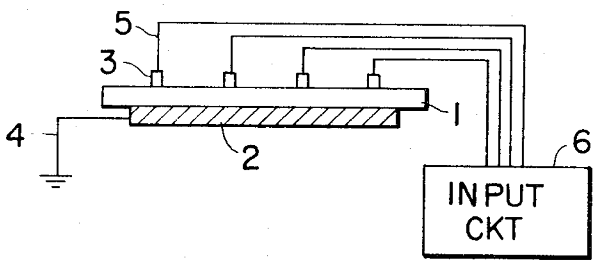
FIGS. 1 to 3 are schematic views showing some typical embodiments of the coordinate input apparatuses of this invention, in each of which (A) is a cross-sectional view and (B) a top plan view.
Figure 1B:
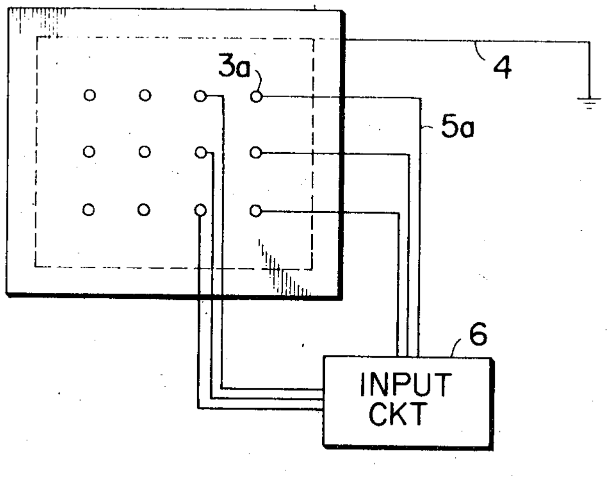

Referring to FIGS. 1A and 1B, an electrically conducting electrode 2 of material, such as gold, silver, copper, aluminum or graphite, is deposited by vacuum evaporation on substantially all of one surface of a pyroelectric polymeric film 1, and an electrically conducting electrode 3 is similarly adhered to each of a plurality of localities on the reverse side of the film, either by bonding or by vacuum evaporation. One end of the conducting electrode 2 is grounded by a ground line 4. An output wire 5 is connected to each conducting electrode 3 and is connected to an input circuit 6 of a signal detector, a signal storage device, or a communicating device, etc. For example, when radiations, such as infrared rays, are applied to an electrode 3*a*, a pyroelectric current is generated at this portion. The current passes through wire 5*a* and flows into the input circuit 6 as a signal corresponding to the intensity of the infrared rays.

Figure 2A:
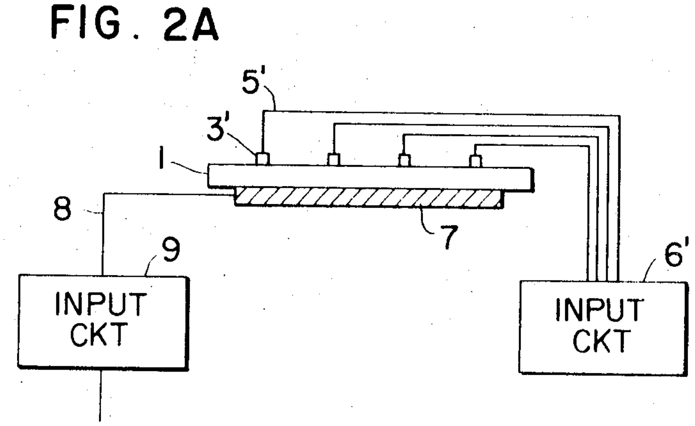
Figure 2B:
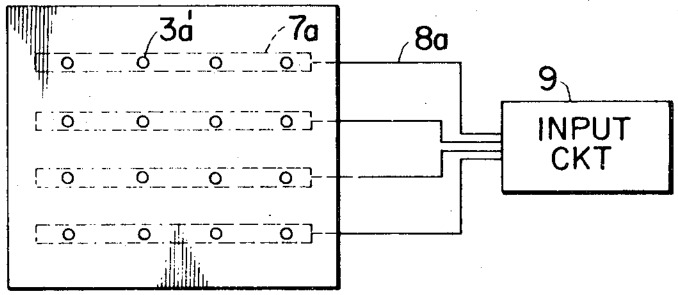

In FIGS. 2A and 2B, a plurality of elongated electrically conducting electrodes 7 are applied in parallel to each other to one surface of a pyroelectric film either by vacuum evaporation or by bonding. Electrically conducting electrodes 3′ are bonded locally to the back surface of said film and connected to an input circuit 6′ through an output wire 5′. The parallel electrically conducting electrodes 7 are sometimes connected to the ground line, but if an output wire 8 is led out separately from each of the conducting electrodes 7 and connected to another input circuit 9, it is possible, for example, to discriminate a pyroelectric current generated at a certain locality 3*a*′ of a conducting electrode 7*a* as a group on 7*a*, which current passes through the wire 8*a*.

Figure 3A:
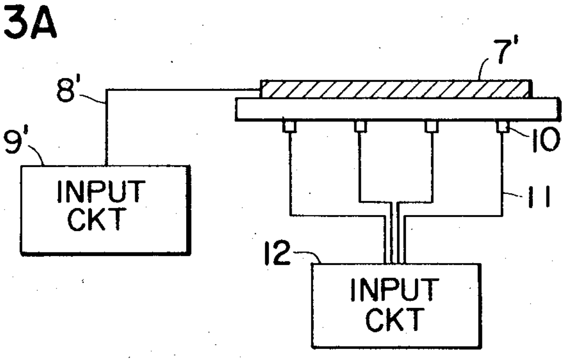
Figure 3B:
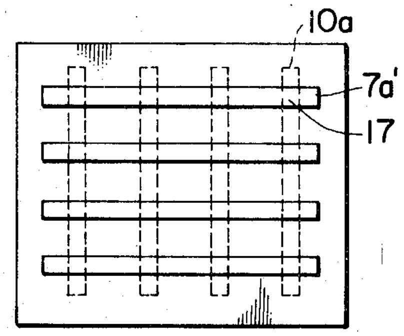

Referring to FIGS. 3A and 3B, a plurality of elongated electrically conducting electrodes 7′ are provided in parallel to each other on one surface of a pyroelectric film 1 in the same way as in FIGS. 2A and 2B, and on the back surface a plurality of elongated electrically conducting electrodes 10 are provided parallel to each other across the electrodes 7′. The conducting electrodes 7′ are connected to an input circuit 9′ via wires 8′, and the electrically conducting electrodes 10 are connected to another input circuit 12 via wires 11. For example, when a pyroelectric current is generated at a point of intersection 17 between electrically conducting electrodes 7′*a* and 10*a* on opposite surfaces of the film, the pyroelectric current enters the input circuit 9′ and 12, respectively, through corresponding ones of the wires 8′ and 11, and are selected and discriminated. Accordingly, the pyroelectric current is detected or recorded as the intersecting point 17. Furthermore, wiring can be greatly simplified in this case, because it is necessary only to connect the wires on the upper and under surfaces. Also, the pyroelectric currents can be detected as groups on each electrode 7' or 10.

Figure 4:
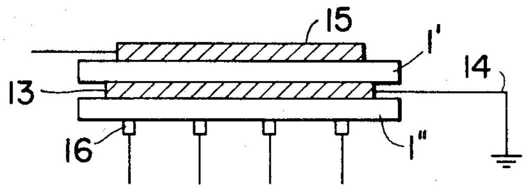
FIG. 4 is a schematic cross-sectional view showing still another coordinate input apparatus of this invention.

In FIG. 4, two pyroelectric films 1' and 1'' are bonded to each other with a conducting film 13 therebetween. The conducting film 13 is connected to a ground line 14. On the exposed surfaces of the films 1' and 1'', parallel elongated electrically conducting electrodes 15 and 16 are bonded or deposited by vacuum evaporation. The conducting electrodes 15 and 16 on the upper film surface cross those on the lower film surface. The apparatus can be used in the same way as in the embodiment shown in FIG. 3.

The invention is not limited to the specific embodiments shown in FIGS. 1 and 4, and many other modifications can be made within the scope of the invention.

Examples of the pyroelectric polymers that can be used in this invention are polyvinyl fluoride, polyvinylidene fluoride, polyvinyl chloride, polyvinylidene chloride and other crystalline polymers. A vinylidene fluoride resin which is oriented and polarized under high voltage is most preferred because of its extremely high pyroelectric properties. Suitable vinylidene fluoride resins include, for example, a homopolymer of vinylidene fluoride, copolymers of vinylidene fluoride with a minor proportion of a copolymerizable monomer, and blends of the homopolymer or the copolymers with a minor proportion of other polymers. When the polymer is fabricated into a film, an inorganic filler can be incorporated therein.

A film of a vinylidene fluoride copolymer containing at least 70 percent of units derived from vinylidene fluoride is most preferred because not only can a pyroelectric material of extremely high degree be obtained from such a film, but also it becomes a very stable pyroelectric material by heat-treatment or by subjecting it to water or a high humidity atmosphere.

For example, when a film of a homopolymer of vinylidene fluoride is treated at 40° C. to the melting point thereof under a high voltage of 150 to 1500 KV/cm, the treated film has a pyroelectricity of $10^{-7}$ to $10^{-9}$ coulomb/cm$^2$· °C. Immediately after production, this film does not necessarily show a constant relation between the dosage of radiation and the pyroelectric current generated, but by heat-treating this film at a temperature of 50° C. to the melting point thereof or repeatedly raising or lowering the temperature, the pyroelectric current can be converged to a certain constant value. Even after this converging, a pyroelectricity of about $10^{-9}$ to $10^{-10}$ coulomb/cm$^2$· °C. can be obtained, and therefore, such a polymer proves very useful.

Further advantages of this invention are that the polymeric film can be made very thin, i.e., about 1 micron, and the heat capacity of the film can be reduced greatly. Also, very small-size electrodes can be provided on the surface of the film, and an extremely great amount of information can be processed using sensitive and small areas. Thick films can be obtained freely, but the films should preferably have a thickness of not more than 50 microns.

The invention will now be specifically described by the following Examples.

EXAMPLE 1

Onto the lower surface of a pyroelectric polyvinylidene fluoride resin film having a thickness of 50 microns and an area of 10 cm. × 10 cm., said sheet having been monoaxially stretched at 90° C., was vacuum deposited gold to provide plural electrode strips each having a width of 2 mm. and arranged in parallel thereon with an interval of 1 mm. Also, gold was vacuum deposited on the whole upper surface of the polymer film to provide a ground electrode. Apart from this, gold was vacuum deposited on the whole lower surface of a pyroelectric polymer film of the same resin and the same dimensions as above to provide a ground electrode and also gold was vacuum deposited on the upper surface of the polymer film to provide plural electrode strips having a width of 2 mm. and arranged thereon in parallel with an interval of 1 mm. In addition, the vacuum deposited electrodes formed above were all transparent to light. The two pyroelectric polymer films, each having the gold transparent films, were piled together so that the direction of the parallel electrodes of the one film was perpendicular to the direction of the parallel electrodes of the other, and the assembly was further attached to a glass sheet. One of the parallel electrodes on the surface of the one pyroelectric polymer film was connected with one of the parallel electrodes on the surface of the other pyroelectric polymer film through a circuit having EFT. When the cross point of the electrodes thus connected to the current meter circuit was irradiated by a spot of white light having a diameter of 1 mm. for 0.5 second, a pyroelectric current of the order of $10^{-11}$ ampere was observed. Also, when only the electrode adjacent to the electrode connected to the current meter circuit was irradiated, the current detected by the current meter circuit was only less than 5 percent of the pyroelectric current observed above, and also it was confirmed that the pyroelectric current was obtained from only the electrodes irradiated by the light. Accordingly, it was confirmed that the selective output of coordinate became possible.

EXAMPLE 2

On the whole upper surface of a pyroelectric film of polyvinylidene fluoride resin having a thickness of 50 microns and an area of 10 cm. × 10 cm., said film having been monoaxially stretched, was vacuum deposited to provide a ground electrode and also a number of circular electrodes of gold having a diameter of 5 mm. were formed on the lower surface of the film by vacuum deposition with an interval of 1 cm. One of the circular electrodes and the ground electrode were connected to a circuit having EHT. When the portion of the circular electrode connected to the current circuit was irradiated by the spot of white light having a diameter of 2 mm. for 0.5 second, an electric current was observed. On the other hand, when a circular electrode adjacent the circular electrode connected to the current meter circuit was irradiated, an electric current was hardly observed. The above results showed the possibility of the indication of coordinate.

Furthermore, it was also confirmed that when a copolymer of 85 parts by weight of vinylidene fluoride and 15 parts by weight of tetrafluoroethylene was used in place of the polyvinylidene fluoride resin in the same experiment as above, the indication of coordinate was also possible.

While the invention has been particularly shown and described with reference to a preferred embodiment thereof, it will be understood by those skilled in the art that various changes in form and details may be made therein without departing from the spirit and scope of the invention.

We claim:

1. A process for coordinate input which comprises taking out a pyroelectric current from each of a plurality of local light-transparent electrodes provided on the surface of a polymeric film itself having pyroelectric properties, and recognizing the position of a film-irradiating light by detecting the pyroelectric current flowing from each local electrode.

2. A process for coordinate input which comprises conducting an electric current separately from a plurality of light-transparent spot electrodes present here and there on one surface of a polymeric film itself having pyroelectric properties and a surface electrode provided on the opposite surface of said film, and recognizing the position of a film-irradiating light by a pyroelectric current flowing from each spot electrode.

3. A process for coordinate input which comprises providing a plurality of parallel electrodes on one surface of a polymeric film itself having pyroelectric properties, providing on the opposite surface of said film a plurality of light-transparent spot electrodes on lines corresponding to said parallel electrodes, conducting an electric current separately from each spot electrode, and recognizing the position of a film-irradiating light by a pyroelectric current flowing from each spot electrode.

4. A process for coordinate input which comprises providing linear electrodes on both surfaces of a polymeric film itself having pyroelectric properties, the lines on the same surface being parallel to each other, and the lines on one surface crossing those on the other surface, conducting an electric current separately from each of the electrodes on both surfaces, and recognizing the position of a film-irradiating light as a point of intersection of linear electric currents on both surfaces by means of a pyroelectric current flowing in one linear electrode on each of said surfaces.

5. The process of claim 1 wherein said polymeric film is polyvinylidene fluoride.

6. A coordinate input apparatus responsive to light irradiation and comprising:

a. a polymeric film itself having pyroelectric properties,
b. a plurality of spaced pyroelectric current conducting light-transparent first electrodes on one surface of said film,
c. recognition circuit means, and
d. first conductor means individually connecting each of said first electrodes to said recognition circuit means, whereby pyroelectric current generated by light irradiation at a locality in said film causes a pyroelectric current signal to flow through a corresponding one of said first electrodes to said recognition circuit means, said corresponding first electrode identifying the coordinates of said locality and said current signal being indicative of the intensity of the light irradiation at said locality.

7. A coordinate input apparatus as defined in claim 6 wherein said first electrodes are spot electrodes, and further comprising a surface electrode on the opposite surface of said film.

8. A coordinate input apparatus as defined in claim 6 wherein said first electrodes are spot electrodes arranged in lines, and further comprising a plurality of elongated parallel second electrodes on the opposite surface of said film and arranged in alignment with said lines, and second conductor means individually connecting each of said second electrodes to said recognition circuit means.

9. A coordinate input apparatus as defined in claim 6 wherein said first electrodes are parallel elongated electrodes, and further comprising a plurality of parallel spaced second electrodes on the opposite surface of said film and extending transversely to said first electrodes, and second conductor means individually connecting each of said second electrodes to said recognition circuit means.

10. A coordinate input apparatus as defined in claim 6 wherein said polymeric film is polyvinylidene fluoride.

11. A coordinate input apparatus as defined in claim 6 wherein said film is about one micron thick.

12. A coordinate input apparatus as defined in claim 6 wherein said film is from one to fifty microns thick.

13. A coordinate input apparatus as defined in claim 6 wherein said film is polyvinylidene fluoride.

14. A coordinate input apparatus as defined in claim 6 wherein the polymeric film is selected from the group consisting of polyvinyl fluoride, polyvinylidene fluoride, polyvinyl chloride, polyvinylidene and chloride.

* * * * *